United States Patent
Ernst et al.

(10) Patent No.: US 9,206,604 B2
(45) Date of Patent: *Dec. 8, 2015

(54) ROD HANGER FOR SECURING A ROD TO A SUBSTRATE

(71) Applicant: ILLINOIS TOOL WORKS INC., Glenview, IL (US)

(72) Inventors: Richard J. Ernst, San Diego, CA (US); Donald Buytaert, Huntley, IL (US); Michael S. Popovich, Bartlett, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/178,969

(22) Filed: Feb. 12, 2014

(65) Prior Publication Data

US 2014/0158850 A1 Jun. 12, 2014

Related U.S. Application Data

(63) Continuation of application No. 10/687,451, filed on Oct. 16, 2003, now Pat. No. 8,672,281.

(51) Int. Cl.

| | |
|---|---|
| *A47H 1/10* | (2006.01) |
| *E04B 9/20* | (2006.01) |
| *E04B 9/18* | (2006.01) |

(52) U.S. Cl.
CPC ... *E04B 9/20* (2013.01); *E04B 9/18* (2013.01); *Y10T 403/39* (2015.01); *Y10T 403/73* (2015.01)

(58) Field of Classification Search
CPC ..................................... E04B 9/18; E04B 9/20
USPC .......... 248/327, 343; 52/506.06, 506.05, 704, 52/712; 403/403, 187; 411/441, 485, 487
See application file for complete search history.

(56) References Cited

U.S. PATENT DOCUMENTS

| | | | |
|---|---|---|---|
| 1,056,596 A | 3/1913 | Sidoli | |
| 1,435,134 A | 11/1922 | Boley | |
| 2,545,347 A | 3/1951 | Embree | |
| 3,788,185 A | 1/1974 | Gutshall | |
| 3,863,879 A | 2/1975 | Herb | |
| 3,870,428 A * | 3/1975 | Jackson | 404/134 |
| 4,543,763 A * | 10/1985 | Ernst et al. | 52/698 |
| 4,987,714 A | 1/1991 | Lemke | |
| 5,110,247 A | 5/1992 | Losada | |
| 5,283,992 A | 2/1994 | Morassutti | |
| 5,292,216 A | 3/1994 | Van Allman | |
| 5,417,534 A | 5/1995 | Losada | |
| 5,546,723 A * | 8/1996 | Jones | 52/698 |
| 5,702,077 A | 12/1997 | Heath | |
| 5,758,465 A * | 6/1998 | Logue | 52/506.06 |

(Continued)

FOREIGN PATENT DOCUMENTS

| | | |
|---|---|---|
| FR | 2689941 | 10/1993 |
| WO | 92/21266 | 12/1992 |

*Primary Examiner* — Todd M Epps
(74) *Attorney, Agent, or Firm* — Greer, Burns & Crain, Ltd.; Maurice E. Finnegan, III, Esq.

(57) ABSTRACT

A rod hanger for securing a rod to a substrate includes a mounting portion configured for engaging the substrate, a rod receiving portion configured for receiving the rod and a connecting element configured for vertically displacing the mounting portion and the rod receiving portion. In addition, at least one anti-rotation element configured for engaging the substrate is provided on the mounting portion.

20 Claims, 4 Drawing Sheets

(56) References Cited

U.S. PATENT DOCUMENTS

| | | |
|---|---|---|
| 5,934,855 A | 8/1999 | Osterle et al. |
| 5,937,609 A | 8/1999 | Roth |
| 6,205,730 B1 | 3/2001 | Hasan et al. |
| 6,238,261 B1 | 5/2001 | Lang |
| 6,481,680 B2 | 11/2002 | Neuman |
| 6,667,186 B2 | 12/2003 | Choi |
| 6,669,158 B2 | 12/2003 | Masas |
| 6,677,185 B2 | 1/2004 | Chin et al. |
| 6,692,206 B1 | 2/2004 | Clinch et al. |
| 6,866,458 B2 | 3/2005 | Farrell et al. |
| 8,672,281 B2 * | 3/2014 | Ernst et al. .......... 248/327 |
| 2003/0133768 A1 | 7/2003 | Losada |

* cited by examiner

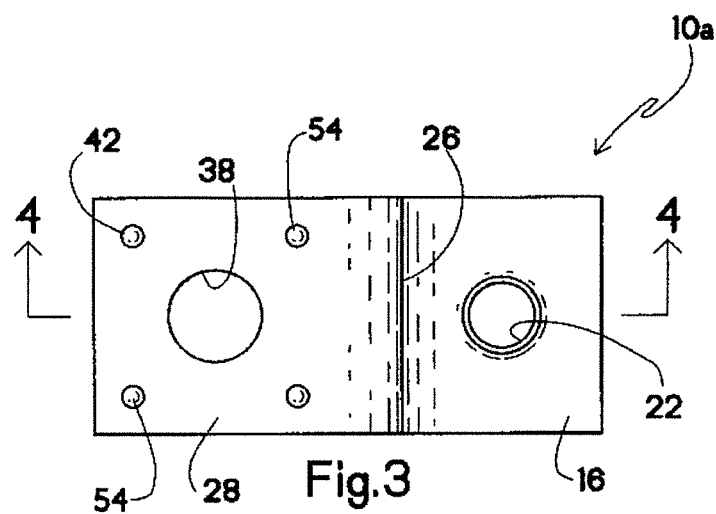
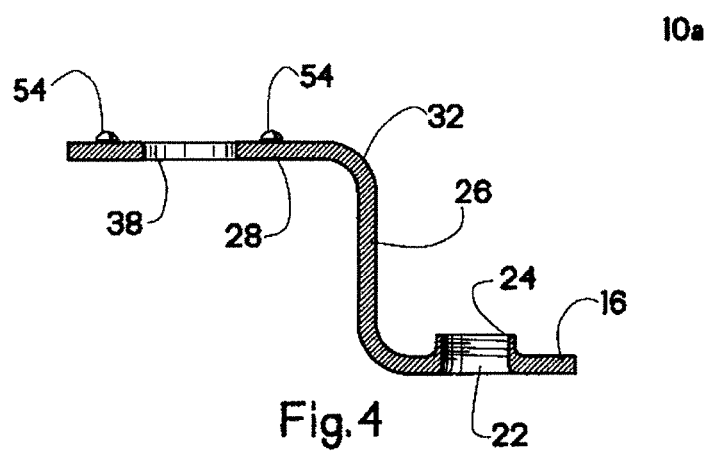
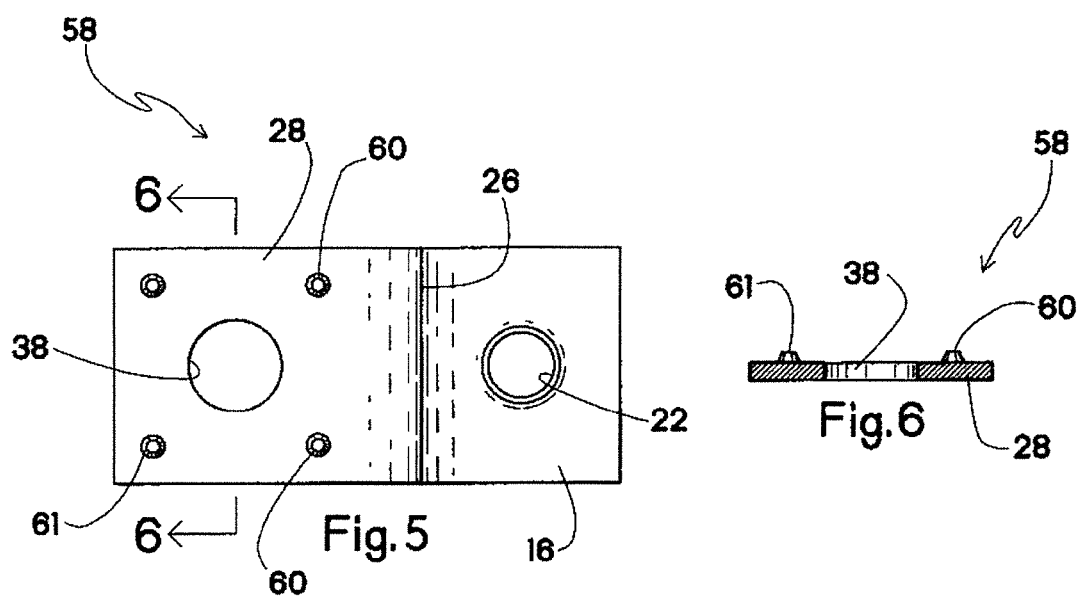

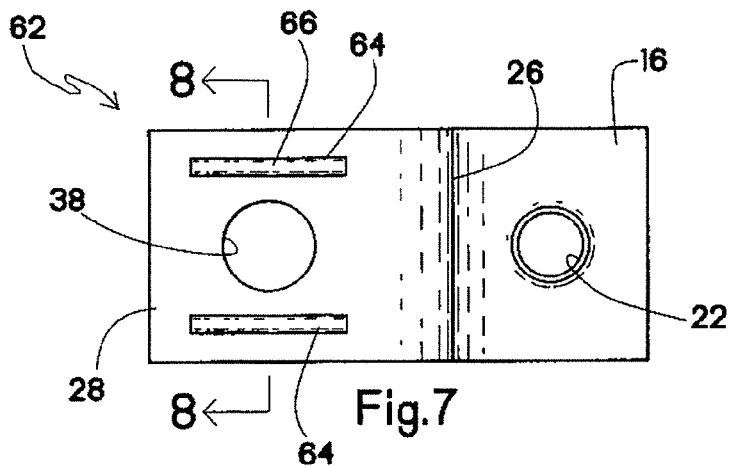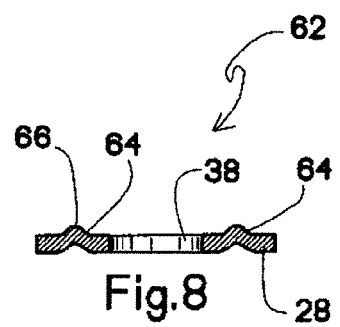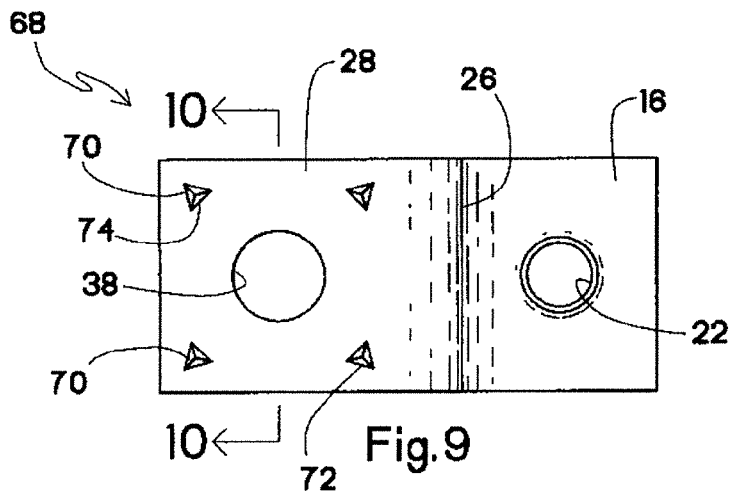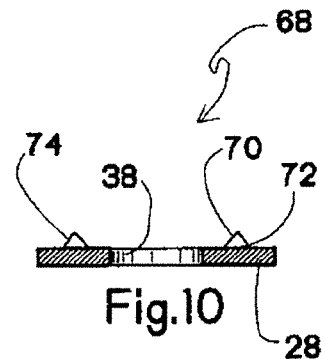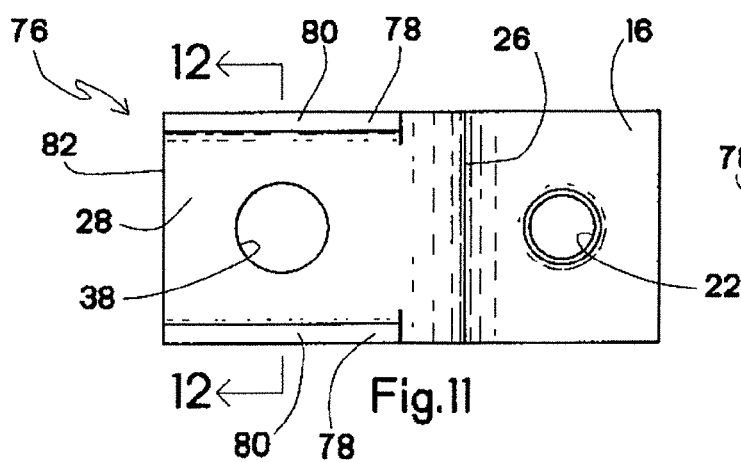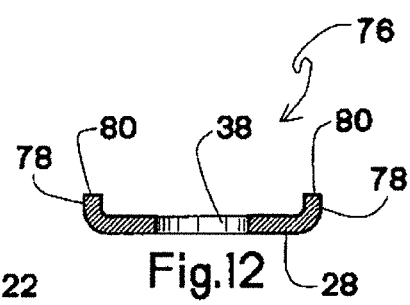

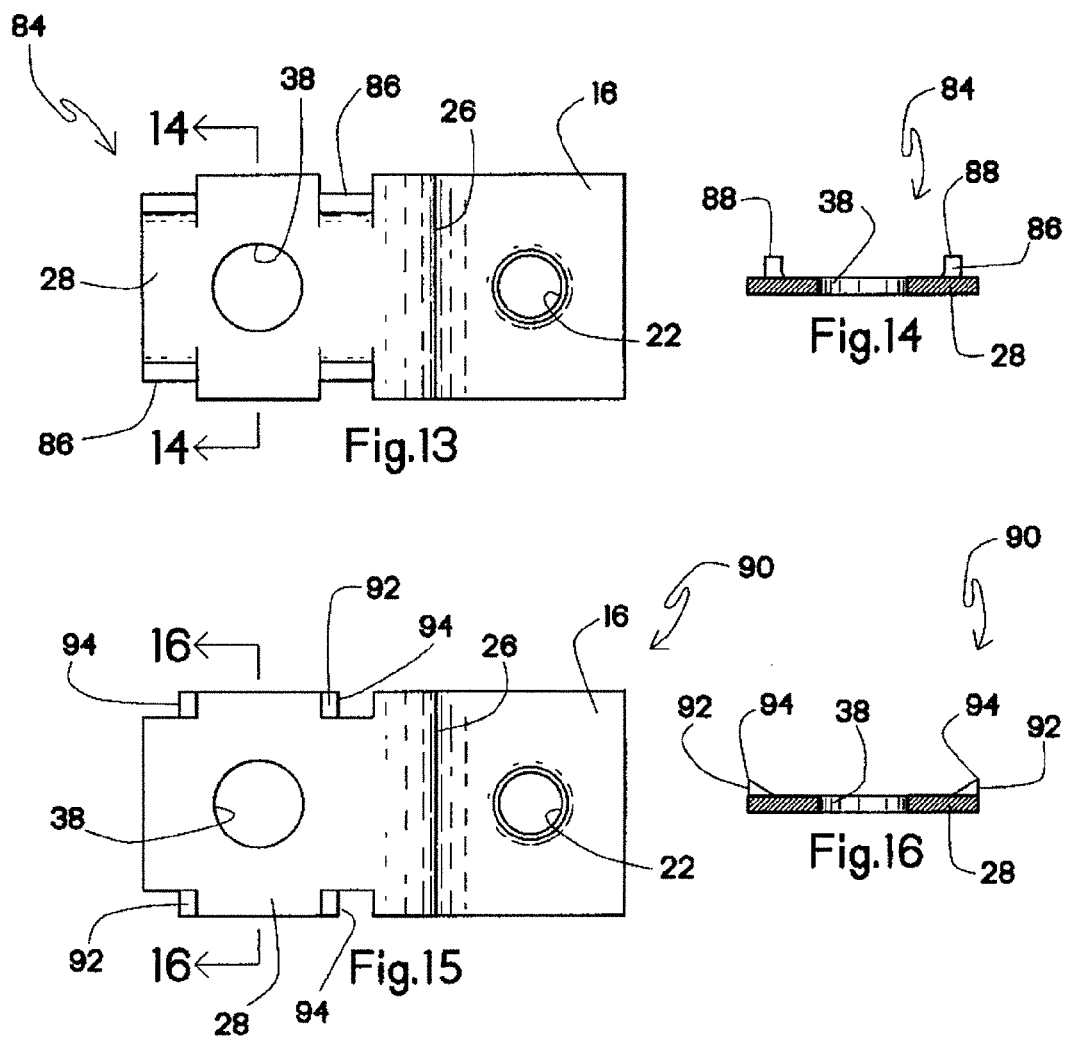

ROD HANGER FOR SECURING A ROD TO A SUBSTRATE

CROSS-REFERENCE TO RELATED APPLICATIONS

The present application is a Continuation of U.S. patent application Ser. No. 10/687,451 filed Oct. 16, 2003; the contents of which are hereby incorporated by reference.

BACKGROUND

The present invention relates to a rod hanger used to secure a rod to a substrate, more specifically, to such rod hangers supporting a suspended ceiling, conduit, or other objects from a substrate.

It is known in the prior art to support a suspended ceiling or objects from a concrete ceiling or other substrate using a plurality of brackets attaching to a concrete ceiling (typically the underside of the floor structure above). Generally, each bracket is associated with a corresponding rod.

Since the floor or substrate from which the brackets are attached is typically made of concrete or other hard building material, powder actuated tools are often used during the bracket installation. The bracket typically includes a mounting portion that engages both a securing pin and the substrate. Each bracket also typically includes a threaded portion for engaging the rod. The mounting portion and the threaded portion are connected to each other.

One disadvantage of the prior art brackets is that they often become misaligned after installation. More specifically, a moment or twisting force placed on the rod hanger when attaching the rod to the bracket causes the bracket to rotate from its desired orientation. Such rotation may generally cause a misalignment and/or support malfunction of the threaded rod. As a result of the brackets becoming misaligned, the installer will have to readjust the rod hanger to its original position.

Thus, there is a need for an improved rod hanger or hanger bracket which can resist the above-identified rotational forces. There is also a need for such an improved bracket which is securely attachable upon concrete ceilings or other substrates.

SUMMARY

To address the above-identified needs, and to alleviate the need for readjusting brackets which have rotated from their original positions after installation, the invention provides a rod hanger with anti-rotation elements for reducing the effect of rotational moments encountered during or after installation.

More specifically, the present rod hanger for securing a rod to a substrate includes a mounting portion configured for engaging the substrate, a rod receiving portion configured for receiving the rod and a connecting element configured for vertically displacing the mounting portion and the rod receiving portion. In addition, the present rod hanger includes at least one anti-rotation element on the mounting portion configured for engaging the substrate.

BRIEF DESCRIPTION OF DRAWINGS

FIG. 3 is a top view of an alternate embodiment of the present rod hanger;

FIG. 4 is a cross-section taken along the line 4-4 of FIG. 3 and in the direction generally indicated;

FIG. 5 is a top view of a second alternate embodiment of the rod hanger of FIG. 1;

FIG. 6 is a cross-section taken along the line 6-6 of FIG. 5 and in the direction generally indicated;

FIG. 7 is a top view of a third alternate embodiment of the present rod hanger;

FIG. 8 is a cross-section taken along the line 8-8 of FIG. 7 and in the direction generally indicated;

FIG. 9 is a top view of a fourth alternate embodiment of the rod hanger of FIG. 1;

FIG. 10 is a cross-section taken along the line 10-10 of FIG. 9 and in the direction generally indicated;

FIG. 11 is a top view of a fifth alternate embodiment of the rod hanger of FIG. 1; and FIG. 12 is a cross-section taken along the line 12-12 of FIG. 11 and in the direction generally indicated.

FIG. 13 is a top view of a sixth alternate embodiment of the rod hanger of FIG. 1;

FIG. 14 is a cross-section taken along the line 14-14 of FIG. 13 and in the direction generally indicated;

FIG. 15 is a top view of a seventh alternate embodiment of the rod hanger of FIG. 1; and FIG. 16 is a cross-section taken along the line 16-16 of FIG. 15 and in the direction generally indicated.

DETAILED DESCRIPTION OF THE PREFERRED EMBODIMENTS

Figure 1:
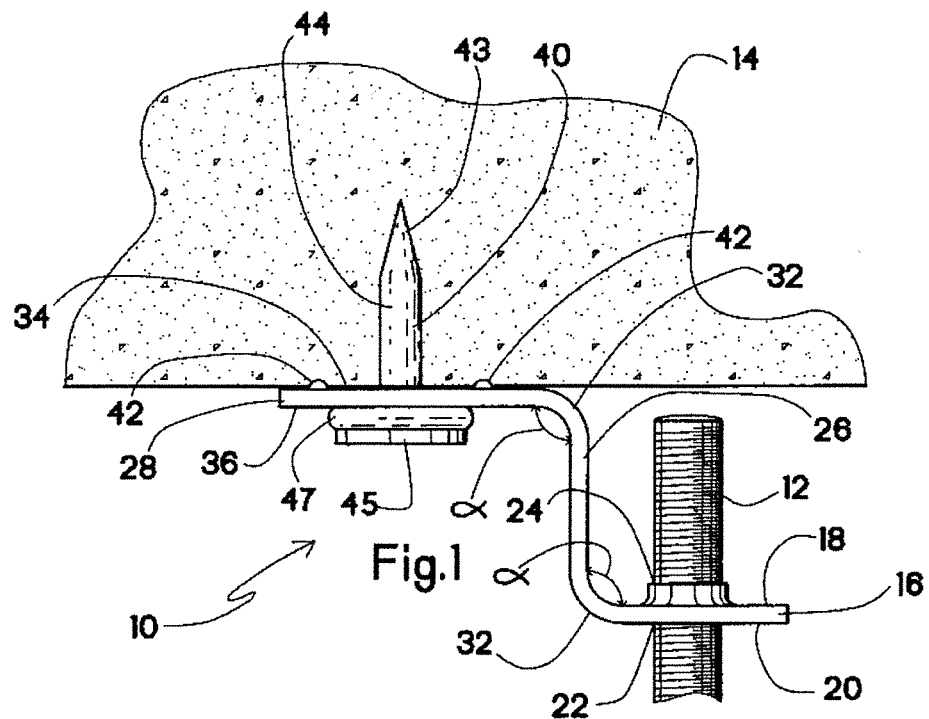
FIG. 1 is a side view of the present rod hanger secured to a substrate with a rod attached, both the substrate and the rod shown fragmentarily.
Figure 2:
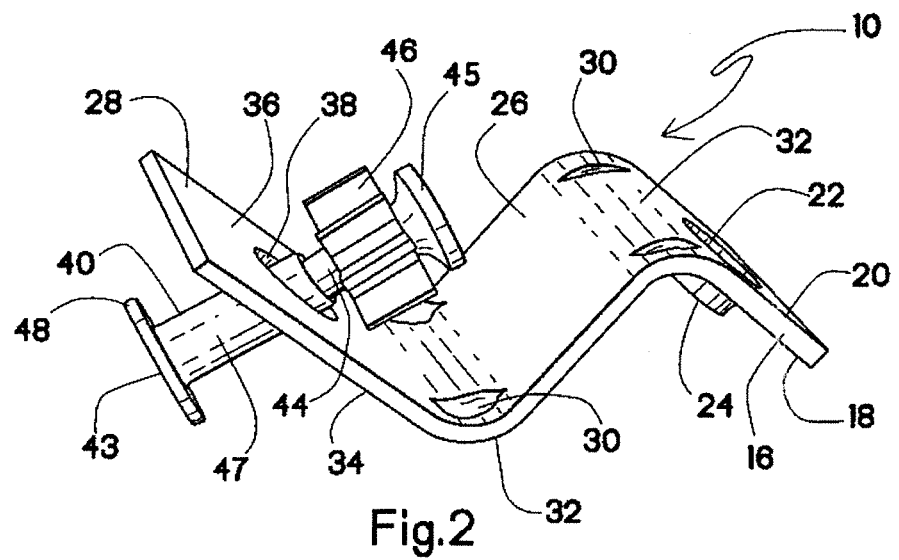
FIG. 2 is a perspective view of the present rod hanger with a fastener captured within a hole on the mounting portion.

Referring now to FIGS. 1 and 2, a rod hanger suitable for incorporating the present invention is generally designated 10 and is shown securing a threaded rod 12 to a substrate 14. Included on a rod receiving portion 16 configured for receiving the rod 12, are a top surface 18, a bottom surface 20, and a hole 22 configured for threadably engaging the rod 12. The hole 22 preferably includes a lip formation 24 disposed at least partially about the hole and is also configured to threadably engage the rod 12.

A connecting element 26 is configured for vertically displacing a mounting portion 28 and the rod receiving portion 16. In one embodiment, the planes respectively defined by the mounting portion 28 and the rod receiving portion 16 are generally parallel. Preferably, the angles α formed by the connecting element 26 and the mounting portion 28 and by the connecting element 26 and the rod receiving portion 16 will be approximately ninety degrees. Other angular orientations are contemplated for the angles α. Regardless of the specific angular orientation of the connecting element 26 relative to the mounting and rod receiving portions 28, 16, the mounting portion should be disposed in a relatively flush relationship to the substrate 14 (best seen in FIG. 1).

It is also contemplated that the connecting element 26 further includes at least one and preferably two coined impressions 30 at a juncture 32 defined by the connecting element 26 and the rod receiving portion 16, and at least one and preferably two coined impressions 30 at a juncture 32 defined by the connecting element 26 and the mounting portion 28. The coined impressions 30 at the junctures 32 of the rod hanger 10 increase the strength of the rod hanger. Further, the number and disposition of the coined impressions 30 may vary to suit the application. In addition, in the preferred embodiment, the mounting portion 28 and the rod receiving portion 16 define a generally planar shape, and with the connecting element 26 define a unitary body with a generally uniform thickness.

The mounting portion 28 includes a top surface 34, a bottom surface 36 and a hole 38 configured for engaging a fastener 40. In the preferred embodiment, the top surface 34 of the mounting portion 28 includes at least one, preferably several, anti-rotation elements 42 configured for engaging the substrate 14 and counteracting any rotational moments acted upon the rod hanger 10 after engagement with the substrate 14. It is contemplated that at least one anti-rotation element 42 engages the substrate 14 along with a pin end 43 of the fastener 40. As such, the elements 42 need not be mounted on the top surface 34, but may alternately be located elsewhere on the mounting portion 28, such as on edges or bottom surface 36.

Referring now to FIG. 2, the rod hanger 10, or any of the alternate embodiments described below is preferably provided with the fastener 40 associated with the mounting portion 28 and is dimensioned to extend through the hole 38 in the mounting portion 28. This arrangement facilitates one-handed application of the rod hanger 10 to the substrate 14. The fastener 40 includes the pin end 43 connected to a shank portion 44 and a head 45. Also included on the fastener 40 is an annular fluted member 46 and a sleeve-like guard member 47 having a radially flared end 48. The fluted member 46, typically made of plastic, circumscribes the fastener and facilitates the passage of the fastener in a powder actuated tool. The guard member 47 circumscribes the pin end 43 and typically prevents injury prior to installation of the rod hanger 10. Upon driving of the fastener 40 into the substrate 14, the fluted member 46 becomes crushed against the mounting portion 28, forming a resilient seal. Also, the guard member 47 becomes crushed between the mounting portion 28 and the head 45 (FIG. 1). The flared end 48 also becomes crushed between the substrate 14 and the mounting portion 28.

It is also contemplated that the anti-rotation elements 42 can have a variety of different forms and can be disposed in a plurality of locations on the mounting portion 28. In addition, different anti-rotation element shapes or different anti-rotation spatial configurations may be more suitable for different types of substrates. Some exemplary variations are depicted in FIGS. 3-17. In all of the embodiments depicted, common structural components have been designated with the same reference numbers.

Referring now to FIGS. 3 and 4, in the rod hanger generally designated 10a, the anti-rotation elements 42 are provided with a resilient rubber or polymeric cover 54 for enhancing the adhesion of the mounting portion 28 to the substrate 14. It is contemplated that the cover 54 is secured to the elements 42 by overmolding, thermoforming, chemical adhesive or other known technologies, and that a lower margin 56 of the cover may extend fully or partially over the element.

Referring now to FIGS. 5 and 6, the main distinction between the rod hanger 10 and the depicted alternate embodiment 58 is that the anti-rotation elements 60 have the shape of a truncated cone. In the preferred version of this embodiment, the elements 60 are hollow. Upper edges 61 of the elements 60 are either straight or jagged.

Referring now to FIGS. 7 and 8, another alternate embodiment, generally designated 62 features the anti-rotation elements 64 provided in the shape of elongate bars. Two such bars 64 are preferably provided and are disposed on either side of the hole 38; however, the number and disposition of the bars may vary to suit the application. Also, it is contemplated that the length of the bars 64 may vary, and, while shown generally parallel to each other, the relative position of the bars may also vary. A top surface 66 of at least one bar 64 is generally flattened or slightly hemispherical. When viewed from above, the at least one anti-rotation element 64 has a generally rectangular shape with a contoured surface.

Referring now to FIGS. 9 and 10, another alternate embodiment, generally designated 68, features a plurality of generally pointed anti-rotation elements 70. In the preferred embodiment, the elements 70 have a triangular base 72 and three facets 74. However, the precise shape of the base 72 and the number of facets 74 may vary to suit the application. An advantage of the pointed shape of the elements 70 is that the mounting portion 28 is more securely retained than if generally hemispherical elements are provided. While four, generally equally spaced elements 70 are depicted disposed about the hole 38, the number and disposition of the elements may vary to suit the application.

Referring now to FIGS. 11 and 12, another alternate embodiment is generally referred to as 76, and features anti-rotation elements 78 configured as elongate, upturned edges of the mounting portion 28. The elements 78 preferably extend the full length of the mounting portion 28, but their length may vary to suit the application. Also, upper edges 80 of the elements 78 are generally flattened, but other shapes, such as rounded, are also contemplated. While opposing edges of the mounting portion 28 are shown upturned, it is also contemplated that a free edge 82 can alternately be upturned. In the preferred version of this embodiment, the elements 78 are upturned at generally right angles to the mounting portion 28. Other angular orientations are contemplated.

Referring now to FIGS. 13 and 14, yet another alternate embodiment is generally designated 84 and features anti-rotation elements 86 which are formed by upturned edge regions of the mounting portion 28. The elements 86 are formed by stamping and bending the desired areas of the mounting portion 28. In the preferred version of this embodiment, there are four upturned elements 86 disposed uniformly about the hole 38; however, the number and orientation of the elements may vary to suit the application. Also, top surfaces 88 are preferably generally flattened, and the elements 86 preferably form right angles relative to a plane defined by the mounting portion 28. The angular orientation of the elements 86 may also vary to suit the application. Also, the length of the elements 86 may vary provided there is at least some gap between adjacent elements.

Referring now to FIGS. 15 and 16 still another alternate embodiment is generally designated 90 and features anti-rotation elements 92 which are similar to the elements 86 but are pointed at tips 94. The elements 92 are upturned towards each other along a common edge of the mounting portion 28. While four elements 92 are depicted and are disposed uniformly about the hole 38, the number and orientation of the elements may vary to suit the application. Also, the optimal angular orientation of the elements 92 relative to a plane of the mounting portion 28 is ninety degrees. However, other angular orientations are contemplated, provided that the elements 92 provide anti-rotation gripping action against the substrate 14.

Thus, it will be seen that the present rod hanger 10, as well as the alternate embodiments 58, 62, 68, 76, 84 and 90 all feature at least one anti-rotation element for facilitating the attachment of the hanger to the substrate 14. Depending on the composition of the substrate 14, the anti-rotation elements may be provided in a variety of shapes and dispositions. It is also contemplated that further alternate embodiments may be provided incorporating combinations of any of the shapes described above. For example, such a combination can include elements 60, 64 and 70; however other combinations of the elements described above may be provided. Additional structural support is preferably provided by the coined impressions 30.

While particular embodiments of the present rod hanger for securing a rod to a substrate have been described herein, it will be appreciated by those skilled in the art that changes and modifications may be made thereto without departing from the invention in its broader aspects and as set forth in the following claims.

What is claimed:

1. A rod hanger for securing a rod to a substrate, comprising:
    a mounting portion defining a perimeter edge, configured for engaging the substrate and having a hole configured for engaging a fastener;
    a rod receiving portion configured for receiving the rod;
    a connecting element configured for vertically displacing the mounting portion and the rod receiving portion; and
    a plurality of anti-rotation elements on the mounting portion spaced apart from the hole and spaced uniformly from one another along a perimeter of the hole and configured for penetratingly engaging the substrate to frictionally hold the fastener in place while counteracting a moment acting upon said rod hanger as the rod is received by the rod receiving portion.

2. The rod hanger of claim 1, wherein at least one of said mounting portion and said rod receiving portion define a generally planar shape.

3. The rod hanger of claim 1, wherein said mounting portion includes a top surface and a bottom surface.

4. The rod hanger of claim 3, wherein said top surface of said mounting portion includes said plurality of anti-rotation elements.

5. The rod hanger of claim 1, wherein said rod receiving portion includes a top surface, a bottom surface and a hole configured for threadably engaging said rod wherein the hole includes a lip formation disposed about said hole and configured to threadably engage said rod.

6. The rod hanger of claim 1, wherein planes respectively defined by said mounting portion and said rod receiving portion are generally parallel.

7. The rod hanger of claim 1, wherein said connecting element includes at least one coined impression at a juncture defined by said connecting element and said rod receiving portion and at least one coined impression at a juncture defined by said connecting element and said mounting portion.

8. The rod hanger of claim 1, wherein said rod hanger defines a unitary body with a generally uniform thickness.

9. The rod hanger of claim 1, wherein each of said plurality of anti-rotation elements has a generally pointed shape.

10. The rod hanger of claim 1, wherein each of said plurality of anti-rotation elements has a generally rectangular shape when viewed from above and has a contoured surface formed from said mounting surface.

11. The rod hanger of claim 10, wherein a top surface of each of said anti-rotation elements is one or more of generally flattened or slightly hemispherical.

12. The rod hanger of claim 1, wherein said plurality of anti-rotation elements is formed from elongate upturned edges of said mounting portion.

13. The rod hanger of claim 1, wherein said plurality of anti-rotation elements is formed from upturned edges at one or more corners of said mounting portion.

14. The rod hanger of claim 13, wherein a top surface of at least one of said upturned edges is one of flat and pointed.

15. A rod hanger for securing a rod to a substrate, comprising:
    a mounting portion configured for engaging the substrate and having a hole configured for engaging a fastener;
    a rod receiving portion configured for receiving the rod;
    a connecting element configured for vertically displacing the mounting portion and the rod receiving portion; and
    four or more anti-rotation elements having a generally pointed shape and positioned on a top surface of the mounting portion spaced apart from the hole and spaced uniformly from one another along a perimeter of the hole, configured for penetratingly engaging the substrate to frictionally hold the fastener in place while counteracting a moment acting upon the rod hanger as the rod is received by the rod receiving portion.

16. The rod hanger of claim 15, wherein each of said four or more anti-rotation elements is comprised of a generally triangular base and three facets extending from said base.

17. A rod hanger for securing a rod to a substrate, comprising:
    a mounting portion defining a perimeter edge, configured for engaging the substrate and having a hole configured for engaging a fastener;
    a rod receiving portion configured for receiving the rod;
    a connecting element configured for vertically displacing the mounting portion and the rod receiving portion; and
    one or more anti-rotation elements formed by upturned edges of the perimeter edge of the mounting portion spaced apart from the hole and spaced uniformly along a perimeter of the hole and configured for penetratingly engaging the substrate to frictionally hold the fastener in place while counteracting a moment acting upon said rod hanger as the rod is received by the rod receiving portion.

18. The rod hanger of claim 17, wherein a top surface of said one or more anti-rotation elements is one or more of generally flattened or rounded.

19. The rod hanger of claim 17, wherein said upturned edges are defined at corners of said mounting surface.

20. The rod hanger of claim 19, wherein said upturned edges formed from the same perimeter edge face each other and wherein said upturned edges formed from opposing perimeter edges face each other.

* * * * *